(12) United States Patent
Gatos et al.

(10) Patent No.: US 10,766,235 B2
(45) Date of Patent: Sep. 8, 2020

(54) REINFORCED FILM FOR UNITIZATION OF GOODS

(71) Applicant: Megaplast S.A. Packaging Materials Industry, Attica (GR)

(72) Inventors: Konstantinos G. Gatos, Evia (GR); Anthony G. Karandinos, Attica (GR)

(73) Assignee: Megaplast S.A. Packaging Materials industry, Koropu (GR)

( * ) Notice: Subject to any disclaimer, the term of this patent is extended or adjusted under 35 U.S.C. 154(b) by 97 days.

(21) Appl. No.: 15/315,291

(22) PCT Filed: Jun. 26, 2015

(86) PCT No.: PCT/EP2015/064611
§ 371 (c)(1),
(2) Date: Nov. 30, 2016

(87) PCT Pub. No.: WO2016/001107
PCT Pub. Date: Jan. 7, 2016

(65) Prior Publication Data
US 2018/0229485 A1    Aug. 16, 2018

(30) Foreign Application Priority Data

Jun. 30, 2014   (GB) .................................. 1411574.5

(51) Int. Cl.
| | | |
|---|---|---|
| *B32B 27/32* | (2006.01) | |
| *B32B 5/02* | (2006.01) | |
| *B32B 27/12* | (2006.01) | |
| *B32B 27/20* | (2006.01) | |
| *B32B 27/34* | (2006.01) | |
| *B32B 27/36* | (2006.01) | |
| *B32B 27/08* | (2006.01) | |

(52) U.S. Cl.
CPC .............. *B32B 27/32* (2013.01); *B32B 5/022* (2013.01); *B32B 27/08* (2013.01); *B32B 27/12* (2013.01); *B32B 27/20* (2013.01); *B32B 27/34* (2013.01); *B32B 27/36* (2013.01); *B32B 2264/102* (2013.01); *B32B 2264/104* (2013.01); *B32B 2307/51* (2013.01); *B32B 2553/00* (2013.01)

(58) Field of Classification Search
CPC ........ B32B 2264/102; B32B 2264/104; B32B 2307/51; B32B 2553/00; B32B 27/08; B32B 27/12; B32B 27/20; B32B 27/32; B32B 27/34; B32B 27/36; B32B 5/022
See application file for complete search history.

(56) References Cited

U.S. PATENT DOCUMENTS

| | | | | |
|---|---|---|---|---|
| 3,483,071 | A | * | 12/1969 | Frick ........................ D21H 7/36 428/154 |
| 3,567,566 | A | * | 3/1971 | Bandel ................ B29C 61/0633 428/110 |
| 4,597,749 | A | | 7/1986 | Obrien et al. |
| 5,013,595 | A | | 5/1991 | Parry |
| 2007/0184242 | A1 | | 8/2007 | Rodewald |

FOREIGN PATENT DOCUMENTS

| | | |
|---|---|---|
| EP | 1584574 | 10/2005 |
| GB | 1473619 | 5/1977 |
| RU | 2381102 | 2/2010 |
| WO | 2003013854 | 2/2003 |
| WO | 2005021240 | 3/2005 |
| WO | 2006016393 | 2/2006 |
| WO | 2009049804 | 4/2009 |
| WO | 2011026953 | 3/2011 |
| WO | 2011026954 | 3/2011 |

OTHER PUBLICATIONS

International Search Report for PCT/EP2015/064611 dated Aug. 21, 2015.
Written Opinion for PCT/EP2015/064611 dated Aug. 21, 2015.
International Preliminary Report on Patentability for PCT/EP2015/064611 dated Aug. 21, 2015.
Examination Report for AU2015282698 dated Jun. 14, 2018.
Search Report for GB1411574.5 dated Jan. 15, 2015.
Search Report for RU2017102559/05 dated Mar. 20, 2018.

* cited by examiner

*Primary Examiner* — Lawrence D Ferguson
(74) *Attorney, Agent, or Firm* — Christopher M. Scherer; DeWitt LLP

(57) ABSTRACT

The present invention relates to a non-perforated reinforced stretch film comprising: a base film which has a thickness in the range of 3 μm to 18 μm, and 5 to 100 reinforcing strips fixed on at least one surface of said base film, wherein the width of each reinforcing strip is, independently, in the range of 1 mm to 17 mm.

46 Claims, 1 Drawing Sheet

REINFORCED FILM FOR UNITIZATION OF GOODS

CROSS REFERENCE TO RELATED APPLICATIONS

The present application is the U.S. national stage application of International Application PCT/EP2015/064611, filed Jun. 26, 2015, which international application was published on Jan. 7, 2016, as International Publication No. WO2016/001107. The International Application claims priority of British Patent Application No. 1411574.5, filed Jun. 30, 2014, the contents of which are incorporated herein by reference in theft entireties.

FIELD OF THE INVENTION

This invention relates to a reinforced thin film suitable for unitization of goods.

More particularly, this invention is directed to a reinforced stretch film suitable for pallet wrapping, trolley wrapping, bale wrapping and the like, which resists catastrophic tearing during application at a considerably lower film weight compared to other reinforced stretch film known in the art.

BACKGROUND OF THE INVENTION

It is common in practice to exploit stretch film for unitizing goods. The application of such film is usually automated, semi-automated or via the hand-wrapping technique. However, due to sharp corners for example on a pallet or in homogeneities in the film, tearing may occur during application which can lead to catastrophic failure. Such events during wrapping interrupt the packaging procedure requiring additional time and effort for the end-user. In order to minimize failure during wrapping, thicker films are commonly selected. Therefore, the packaging cost and tension necessary to stretch the film are considerably increased.

It is expected that reinforcement of stretch film will hinder the tear propagation during wrapping. In an attempt to compensate film thickness increase and degree of reinforcement WO 2005/021240 A1 describes a film for packaging wherein a section transversal to the longitudinal direction is provided with areas of a greater thickness alternated with areas having a lower thickness. In this embodiment, the thicker areas of said film act as reinforcement. However, the use of the same resin for both film and reinforcement area limits the reinforcing capabilities of said film.

WO 2011/026954 A2 describes a reinforced stretch film wherein a plurality of reinforcing fiber elements protrudes on a base film. The average thickness of the protrusions is always more than the average thickness of the base film. However, the domain of material mixture required at the location where the extruded fiber elements are provided on the base film reduces the thickness of the pure base film material beneath. This latter limits some mechanical properties of said film especially when the base film thickness is very low.

WO 2006/016393 A1 presents a film of extensible packaging material which has longitudinal reinforcing side strips coupled onto a stretch film. Although the edges of said film are reinforced, the rest of the film is prone to tear propagation. The same issue applies to WO 2009/049804 A1.

U.S. Pat. No. 5,013,595 discusses the strengthening of a stretch film with at least an auxiliary band. Said auxiliary band is preferably single. EP 1 584 574 A2 presents a stretch film reinforced with at least one reinforcement strip having a width up to 10% the width of the film. Therein, at least one strip is preferably waved along the longitudinal direction.

WO 03/013854 A1 describes a packaging film reinforced by a highly pre-stretched film of 7 µm to 20 µm thickness which is located on a base film of 14 µm to 35 µm thickness. The limited extensibility claimed for the reinforcement increases prominently the tension required to use the film while blocking rips generated during application.

WO 2011/026953 describes a reinforced tacky stretch film. The base film comprises a stretchable polymeric material having perforations covering at least 25% of the total area of the base film. The perforations are arranged in a series of columns. The film also comprises a multiplicity of strengthening elements fixed on the base film parallel to the longitudinal direction.

Films according to the prior art often have relatively wide reinforcing strips. In the case of stretch films reinforced with only a few strips, tearing is blocked by the strips but a significant proportion of the film between the strips becomes torn. The packaging thus becomes non-functional. When more of these reinforcing strips are placed on the base film to overcome this problem, the stretch film becomes heavier, stiffer, and more tension is required to apply the film. For machine application, the use of such reinforcement on the film may induce slippage of the reinforced film on the stretching rolls, thus less final pre-stretching ratio than expected is obtained. For manual stretching the situation may be worse as the worker will not be able to stretch adequately by hand the film during wrapping. In both of these cases, although a tear will be blocked at the strips, the packaging may not be approved due to increased packaging cost per pallet (i.e. more film/pallet) and/or to inferior goods unitization. Moreover, the hindering of the automated or manual cut at the end of the wrapping is expected now to be more pronounced. This may again be referred to as non-functional.

The object of present invention is to overcome the problems mentioned above, and provide a film wrapping procedure which is not interrupted by breakages such that the goods are adequately protected after utilization. The film should apply even distribution of force to the goods without crushing them. It should be noted that the film of the present invention is specifically used for wrapping of goods, i.e. it cannot be used as an adhesive tape and therefore does not have an adhesive layer.

SUMMARY OF THE INVENTION

According to the present invention, an unperforated reinforced stretch film is provided comprising a stretch film and plurality of reinforcing strips located thereon. Said reinforcing strips are placed on the film such that the goods tolerate an even force distribution during wrapping. For pallet wrapping, the force at the corners of the pallet is suitable for unitization without destroying goods or packages.

The present invention does not cover reinforced perforated stretch films. Perforated stretch films reinforced with strips have specific requirements that should be considered for the film to work properly. More specifically, the perforations are positioned in columns along the machine direction (MD), and thus the strips are preferably positioned in-between adjacent columns. This defines directly the number of said strips. The strips should block tears initiated by perforations and therefore they should be positioned close to adjacent perforations. This latter teaches practice of either wide strips or of at least two strips in the area between adjacent columns of perforations. Consequently, the weight of reinforcements is significantly higher than can be achieved with the present invention. The force distribution in reinforced perforated stretch films is such that perforations (which are prone to tearing) are loaded equally. Accordingly, the cracks emanating from perforations (with or without notched edges) are blocked at adjacent strips preventing catastrophic failure. If a greater tensile load is applied, the reinforced perforated stretch films deform plastically and break under loads close to their tensile strength.

The reinforced stretch film of the present invention is particularly suitable for unitization of goods, e.g. packages, bales, silage or plants bearing sharp edges. The film is generally non-perforated and hence has use where the goods do not need to be ventilated.

It is of great importance for the reinforced film to resist catastrophic failure during wrapping. The combination of reinforcing strip size and distance with any adjacent reinforcing strip of the current invention is such that it provides functional tear blockage. As tear propagation is constrained within the region of adjacent reinforcing strips, the wrapping process can be continued. Hence, the reinforced film integrity for packaging is maintained without interrupting the packaging procedure. For hand-wrapping the end-user cuts said reinforced film by hand after finishing the unitization of the goods. Similarly, for automated wrapping lines the film is cut at its edge by a suitable knife. Thus, said film and more specifically said reinforcing strips are not so strong so as to hinder this intensive application-related automated or manual cut. Films described in WO 2011/026953 fail to be cut in this manner.

The present invention provides the above mentioned combination of characteristics at a minimized overall material usage and cost. Therefore, the stretch film is thin and the plurality of reinforcing strips are as effective as possible at a low overall weight. Such aspects have significant additional benefit on environmental and recycling issues.

BRIEF DESCRIPTION OF THE DRAWINGS

Further features and advantages of the reinforced stretch film according to the present invention become apparent from the following Figures of exemplary embodiments, wherein.

DETAILED DESCRIPTION OF THE INVENTION

Figure 1:
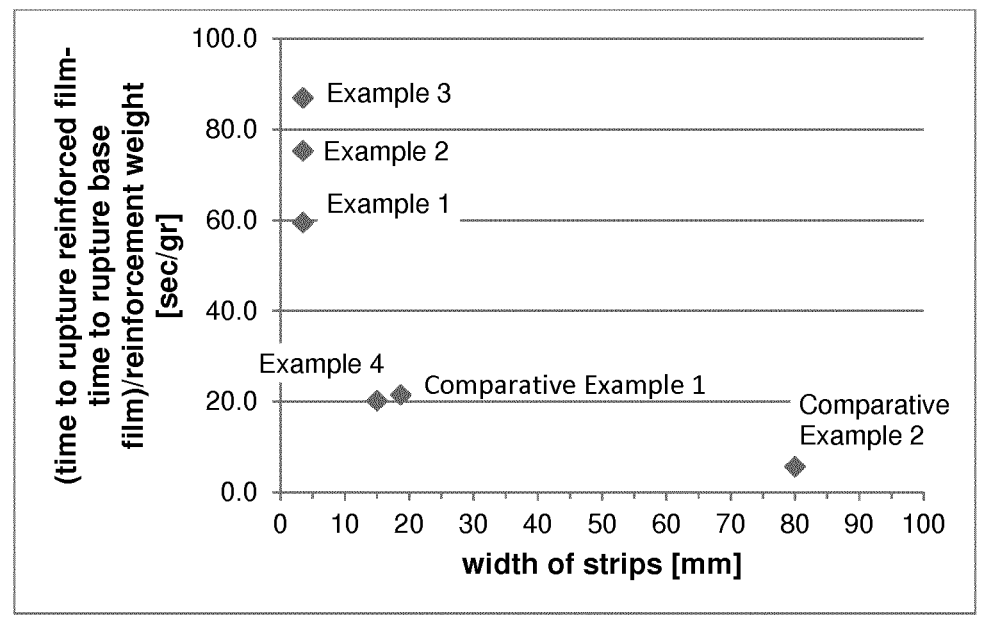
FIG. 1 depicts the time to rupture a reinforced film minus the time to rupture its base stretch film without reinforcements over the weight of reinforcements versus the width of said reinforcing strips.

All preferred embodiments and features according to the present invention should be considered as disclosed in combination with other preferred embodiments and features of the invention.

The reinforced stretch film of the present invention is a non-perforated film. In other words, the base film is a non-perforated film. By "non-perforated" is meant that less than 25%, typically less than 20%, 15%, 10%, 5% or most preferably less than 2% of the total area of the film is covered by perforations. A perforation is a hole which passes through the film. In one preferred embodiment there are substantially no perforations present. Generally, the reinforced stretch film of the present invention does not comprise a perforation pattern. By perforation pattern, is meant a regular arrangement of perforations (holes) along the transverse and/or machine direction. For instance, perforations, if present are not arranged in a series of columns along the longitudinal direction of the film. If there are any perforations present, these are generally sporadically or randomly positioned on the surface of the film. Such perforations may arise as a result of the manufacturing process. Typically the perforations are no more than 5 mm, for instance less than 4 mm, 3 mm, 2 mm or 1 mm in size across their largest dimension.

The reinforced stretch film may be breathable. By "breathable" is meant that that water (i.e. rain) is kept away from the goods that are wrapped, such as bale, but at the same time the film permits water vapour to release itself from the goods that are wrapped. In other words, the reinforced film may comprise micro-pores. For example, if the base film is filled with inorganic particles, such as calcium carbonate, at a specific filler concentration (such as at 5 wt % or 30 wt % or 55 wt % filler concentration) followed by stretching, micro-pores would be generated throughout the base film. Such micro-pores usually emerge at the polymer-particle interface. In industry, it is common for such films to be characterized as micro-porous films.

Preferably, the micro-pores are from 0.01 μm to 100 μm. More preferably, the pore size is from 0.1 μm to 50 μm. Micro-pores are distinct from perforations. Perforations, if present, are larger than micro-pores, for example perforations may be greater than 200 μm across their largest diameter. The presence of micro-pores in the reinforced film does not mean that the film is perforated.

The present invention is directed to low weight reinforced stretch film for efficient unitization of goods. Said reinforced stretch film comprises a stretch film and plurality of reinforcing strips. Said stretch film is preferably thin. The stretch film has a thickness in the range 3 μm to 18 μm. Preferably the stretch film has a thickness of 3 μm to 15 μm and more preferably 3 μm to 9 μm. More preferably the stretch film has a thickness of less than 12 μm. In specific embodiments said thickness is 7 μm to 10 μm, preferably about 8 μm. In certain embodiments the stretch film is partially pre-stretched.

It is a main objective of the present invention to provide a reinforced stretch film for unitization of goods with low weight compared to currently used films in the art. Said weight value is calculated by weighing 1-meter length of the film and expressing it into grams per square meter (g/m$^2$). The weight of the reinforced stretch film of the present invention is preferably less than 22 gr/m$^2$. The weight of the reinforced stretch film of the present invention preferably is less than 20 g/m$^2$. Preferably, the weight of said reinforced stretch film is less than 18 g/m$^2$. In certain embodiments the weight of said reinforced stretch film is preferably less than 15 g/m$^2$. In specific embodiments the weight of said reinforced stretch film is preferably less than 12 g/m$^2$.

The percentage of weight of the plurality of reinforcing strips over the overall weight of the reinforced stretch film is preferably lower than 60% and is for instance in the range 0.5% to 60%. Preferably, the weight percentage of the reinforcing strips over the overall weight of the reinforced film is lower than 50%, more preferably lower than 40% and more than 1%. More preferably, the weight percentage of the reinforcing strips over the overall weight of the reinforced film is lower than 30%. To measure this percentage in a commercial film, apart from the calculations, in case of a commercial film, for estimating this ratio we may perform the following. Cut 1-meter length of product and measure its weight. Detach its strips and measure their weight and then the relevant ratio. Alternately, if the strips cannot be detached, the geometrical dimensions of the base can be calculated and then the weight of the base will be subtracted from the weight of the product.

The stretch film is preferably made of thermoplastic polymers by means of cast or blown extrusion. Preferably said thermoplastic polymers are polyolefins. For example, the polyolefin may be selected from the group consisting of polyethylene, polypropylene, polybut-ene and poly-4-methylpent-1-ene. Further examples include polymers of cycloolefins, for example of cyclopentene or norbornene. Preferably, the polyolefin used in the film is polyethylene.

Particularly preferred stretch films include those made of polyethylene, medium density polyethylene (MDPE), low density polyethylene (LDPE), linear low density polyethylene (LLDPE), branched low density polyethylene (BLDPE), very low density polyethylene (VLDPE) and ultra low density polyethylene (ULDPE).

The films may also comprise mixtures of polyolefins. For example, polypropylene with polyethylene (for example PP/HDPE, PP/LDPE) and mixtures of different types of polyethylene (for example LDPE/HDPE).

Particularly preferred polyolefins for use in the films and strengthening elements of the present invention are LLDPE C4, LLDPE C6, LLDPE C8, metallocene LLDPE C6 or LLDPE C8 and high pressure LDPE. Furthermore, the films of the present invention may comprise copolymers of monoolefins with each other or with other vinyl monomers, for example ethylene/propylene copolymers, linear low density polyethylene (LLDPE) and mixtures thereof with low density polyethylene (LDPE), propylene/but-1-ene copolymers.

In specific embodiments, the reinforced film of the present invention includes additives, such as reinforcing fillers, antioxidants, UV stabilizers, corrosion inhibitors, antistatic agents, antimicrobial substances, etc. The base film may contain inorganic fillers such as calcium carbonates, metal oxides, layered silicates, etc.

In an embodiment, the reinforced stretch film is nonwoven.

The stretch film involves a monolayer or multilayer structure. Preferably said film is multilayer. In preferred embodiments said structure includes nanolayers. These layers preferably have a thickness in the range of less than 1000 nanometers. Examples of such multilayer structures are disclosed in WO 2011/026954 A2. The reinforcing strips of said reinforced stretch film are preferably made of thermoplastic polymers. In preferred embodiments said reinforcing strips are made of polyolefins such as polyethylene. In specific embodiments the reinforcing strips are non-polyolefins such as polyamides or polyesters. In other embodiments the reinforcing strips comprise a blend of polyolefins with non-polyolefins. The reinforcing strips preferably comprise a monolayer or multilayer structure. The film composition used for producing the reinforcing strips can be the same or different compared to the composition used to produce the base film. The reinforcing strips can be prestretched (prior to their positioning on the base film). Thus, a wide range of oriented reinforcing strips according to the need of the application can be obtained. It is preferred that the reinforcing strips are stretchable during wrapping.

The width of each reinforcing strip is its smallest dimension in the plane of the film once the strip has been applied to the film. It is the dimension transverse to the machine direction if the strip were to be positioned longitudinal. The width is generally smaller than the length of a strip. The height of each reinforcing strip is the dimension which projects out of the plane of the film once the strip has been applied to the film. The thickness of each reinforcing strip is the height before the strip is applied to the film. When any of the widths, heights or thicknesses vary, the average values may be calculated to see whether they fall within the ranges specified, or alternatively the strip will fall within the ranges claimed if the values, at any point, fall within the specified ranges. Furthermore, the dimensions of a strip may vary before and after application to a film. The preferred dimensions below refer to dimensions once applied to a film.

The width of each reinforcing strip is, independently, in the range of 1 mm to 17 mm or less, preferably 1 mm to 15 mm, more preferably 1 mm to 12 mm, most preferably 2 mm to 10 mm. Each reinforcing strip may have a different width, or each reinforcing strip may have the same with as another reinforcing strip, but they do not necessarily all have the same width. In specific embodiments the width of at least one reinforcing strip varies along the machine direction (MD).

The reinforcing strip is substantially the same width for its entire length. For example, the width does not vary by more than about 20% or about 10% over its entire length. Preferably, the width does not vary by more than about 5% over its entire length.

The thickness of each reinforcing strip is preferably 3 µm to 90 µm, more preferably 4 µm to 50 µm, such as about 9 µm, about 18 µm, about 30 µm and the like. In specific embodiments the thickness of at least one reinforcing strip varies along the MD and/or TD. Preferably, the thickness of the reinforcing strip is not less than the thickness of the base film.

The thickness of the reinforcing strips is preferably substantially consistent along their lengths. For example, preferably, the thickness does not vary along the length of the reinforcing strip by more than about 10%, more preferably, the thickness does not vary along the length by more than about 5%.

In the present invention the width of the strips is preferably greater than their height. In particular the ratio of the width over the height of said reinforcing strip is preferably 10 to 3000, more preferably 20 to 2000, most preferably 30 to 1000.

The area percentage of stretch film covered by said reinforcing strips is preferably in the range 0.5% to 70%, for instance 2% to 50%, more preferably 5% to 40%, most preferably 10% to 30%.

Additionally, the way that said strips are placed on the base film is important for obtaining functional tear blockage. The distance of adjacent reinforcing strips (strip edge to adjacent strip edge distance) is typically in the range 0.5% to 40% and is preferably 1% to 35%, for instance 1% to 25% or 1% to 15% the width of the stretch film. Preferably, the distance of adjacent reinforcing strips is less than about 10% the width of the stretch film. In certain embodiments the distance of adjacent reinforcing strips is less than about 5% the width of the stretch film. The width of the stretch film is the dimension transverse to the machine direction. In general, the majority of the strips are spaced from each other along the width of the base film.

Said reinforcing strips can have different cross-sectional shapes. In preferred embodiments said shape is rectangular. The cross-section of the reinforcing strips may be oval, triangular, polygonal and the like. In certain embodiments the shape of the cross-section may vary along a reinforcing strip or for adjacent reinforcing strips. At least one reinforcing strip may have wrinkles. In certain embodiments at least one reinforcing strip is folded. In other embodiments at least one reinforcing strip is flat. In preferred embodiments at least one flat reinforcing strip is even and without wrinkles.

The reinforcing strips are preferably positioned on at least one surface of the stretch film. Preferably said reinforcing strips are positioned on the same surface (face) of the stretch film. In the present invention preferably there is a plurality of reinforcing strips located on at least one surface of the stretch film. There are 5 to 100 reinforcing strips on said film. More preferably there are 5 to 80, for instance 10 to 40 reinforcing strips on said film. In other embodiments there are 15 to 30 reinforcing strips on said film.

Said reinforcing strips may take any configuration on said film. In specific preferred embodiments at least one reinforcing strip is wavy or sinusoidal. In other embodiments the reinforcing strips are crossed with one another. In other words, the reinforcing strips may be overlapping. In certain preferred embodiments at least one reinforcing strip is longitudinal. Preferably all reinforcing strips are longitudinal. In certain preferred embodiments the reinforcing strips are continuous. Preferably all reinforcing strips are longitudinal and continuous. Preferably, the reinforcement strips are arranged such that they are substantially parallel to one another.

As detailed in US 2005/0118391, two or more layers of strips may be applied to the base film, one above the other, wherein the strips that are arranged one above the other each comprise the same width. Using this method the strength of the film can be considerably increased.

Alternatively, the reinforcement strips may be arranged such that they are partially overlapping. For example, the strips may be crossed over one another at any angle, or they may be partially overlapping such that they are partially placed on top of one another down their length. For example, two separate strips may overlap by up to 80% with one another, preferably up to 50%.

In another embodiment, the reinforcement strips do not overlap at all.

Preferably, the machine direction of the base film is substantially parallel to the machine direction of the reinforcing strips. In other words, the drawing applied to the base film is in substantially the same direction as the drawing applied to the reinforcing strips and vice versa.

The reinforced stretch film of the present invention is stretchable. In preferred embodiments, said reinforced film is partially pre-stretched prior to handling.

In an embodiment, the reinforced stretch film of the present invention is more than 100% pre-stretched, more than 200% pre-stretched or, more preferably, more than 300% pre-stretched. In a particular embodiment, the reinforced stretch film has low remaining stretch-ability after having been pre-stretched, for example in the range of from 5% to 25%, preferably 5% to 22%, such as 5%, 11%, 18% or 22%. Preferably, the remaining stretch-ability is greater than 5%.

Alternatively, the reinforced stretch film of the present invention has lower than 100% remaining stretch-ability (i.e. elongation at break), preferably lower than 50% remaining stretch-ability measured in accordance with the ASTM 882 Standard.

Alternatively, said reinforced film is less than 250% pre-stretched prior to handling, preferably less than 150% pre-stretched prior to handling. In preferred embodiments the reinforced stretch film of the present invention is less than 100% pre-stretched prior to handling. In specific embodiments said reinforced film is 5% to 20% pre-stretched prior to handling, most preferably about 10% pre-stretched prior to handling. In other embodiments the reinforced stretch film of the present invention has a certain orientation due to the extrusion process involved during film manufacturing.

In specific embodiments, the width of the reinforced stretch film is 30 cm to 190 cm. Preferably, the width of the reinforced stretch film is from 100 cm to 190 cm. When the reinforced stretch film is used as bale wrapping, the width is about 170 cm or about 130 cm or about 100 cm, depending on the relevant requirements.

Alternatively, the width of said reinforced stretch film is from 30 cm to 110 cm. Preferably the width of the reinforced stretch film is from 90 cm to 110 cm, preferably 100 cm. Alternatively the reinforced stretch film is from 65 cm to 85 cm, preferably 75 cm. Alternatively, the reinforced stretch film is from 30 cm to 60 cm, preferably 50 cm. Silage packaging, for instance, is usually 75 cm in width. In specific embodiments said reinforced stretch film is hemmed. The reinforced stretch film of the present invention is provided on a roll (with core or core-less). In specific embodiments the winder machine used for winding of the reinforced stretch film of the present invention oscillates along the TD (Transverse Direction) during winding. In other embodiments the reinforced stretch film of the present invention oscillates along the TD (Transverse Direction) during winding. In some cases both the winder machine and the reinforced stretch film of the present invention oscillate along the TD (Transverse Direction) during winding. In preferred embodiments said reinforced stretch film is provided on a roll, wherein at least a wrap is positioned offset with respect to a next one. This latter can minimize the visual creation of 'mountains and valleys' on the roll which may decline the properties of the reinforced stretch film (e.g. unevenly stretching of the base). Additionally, said oscillation can be tuned at will to reduce the outer diameter of the roll (smoothing the 'mountains') optimizing roll-packaging and transportation costs.

The method of producing a reinforced stretch film of the present invention comprises the steps of i) producing the multilayer base film, ii) producing the reinforcing strips, iii) positioning of the reinforcing strips on at least one surface of said base film.

The coupling of the strips on the base film can be accomplished with known technologies. The adhesion of the strips onto the base film is preferably achieved via surface interactions. Physical adhesion may also arise due to heating of the strip and/or the base to a temperature below relevant melting temperatures and above room temperature. This latter method is preferably assisted by pressing the strips onto said base film. Physical adhesion may also be developed due to contact preferably of strip cling and base cling surfaces.

The reinforcing strips may be mounted on the base film via adhesion, i.e. the application of a chemical adhesive. It is particularly preferred to pre-treat the reinforcing strips on those faces thereof which are intended to contact and bond with the film. However, preferably, there is no bonding layer present in order to couple the strips to the base film.

The method used to couple the strips to the base film preferably does not allow slippage between the base film and the strips.

The method for positioning the reinforcing strips onto the base film does not generally create a domain of material mixture of the base film material and the strip material. Steps i), ii) and iii) are carried out either in sequential order or step ii) is carried out before step i). In preferred embodiments step ii) involves the sub-steps of producing initially a film from which the reinforcing strips are cut. In certain embodiments the reinforcing strips are cut in-line from an extruded multilayer base film and are in-line positioned on at least one surface of said base film prior to winding. Step iii) can take place either in-line or off-line with steps i) and ii). Preferably, the film produced by the method is as defined herein and/or in the claims. It may take the form of any preferred embodiments referred to herein.

Said reinforced stretch film impedes efficiently a catastrophic failure during wrapping. This has been evaluated on an Instron (Model 3365) universal testing machine using a load-cell of 1 kN in tension mode. The grip-to-grip distance was set 10 cm and the width of the specimen was the actual width of the film. A crack of 5 mm along the TD was created in the middle of the film and the tear experiment took place at a constant rate of grip separation of 1000 mm/min. The maximum force required to propagate the initial crack represents the tearing force and it is expressed in kilograms (kg). The time to rupture is the total time from the starting of the experiment until total tearing has occurred and it is expressed in seconds (sec). The area under the curve of the force versus extension till total tearing represents the work of rupture and it is expressed in Joules (J). At the maximum force the crack starts to propagate towards the edge of the film along the TD. Due to the configuration of the experiment two cracks are directed at the same time at opposite directions towards the two opposite edges of the film, respectively. The ambient temperature when carrying out the experiments was 23° C. and the humidity was 50%. The weight of the reinforcing strips which was considered for the calculations is the weight of the reinforcing strips attached on the base film for a length equal to the grip to grip distance and it is expressed in grams (gr).

As used herein 'catastrophic failure' is used to denote a situation where a film is torn totally along its transverse direction (TD). However, in some cases, especially when there is hemming at the edges of the film, the crack may become blunt and tearing is blocked. In that case, a significant portion of the film has already been torn and the film is held only through two narrow bands at its side edges. In experiments for determining time or work to rupture, in this case, the time for tearing should equate to the time taken for the tear to reach the edge bands. Otherwise, erroneous data will be produced (increased "time to rupture").

The reinforced stretch film of the present invention unitizes goods efficiently. Usually for stretch film applications the goods are wrapped with several turns of stretch film. However, when a sharp edge initiates a crack on the film during application its propagation is fast and the crack induces catastrophic failure. This is related with the little time required for the crack to reach the edge of the film. Additionally, such a failure requires low work to rupture the film. In general, for reinforced stretch film the crack is blocked temporarily or permanently at the reinforcement. The weight of the reinforcements placed on the film should not unduly increase the overall weight. More precisely, the property difference over the added weight (termed thereon as specific property) should be as high as possible. In order for the reinforcements of the film to impede efficiently catastrophic failure they should delay the crack to reach the edge of the film compared to the non-reinforced base. Thus the specific time required by the crack to reach the edge of the film should be high. Similarly, the specific work to rupture should also be high. The reinforced stretch film of the current invention presents a surprisingly higher specific time required by the crack to reach the edge of the film and a surprisingly higher specific work to rupture the film than other reinforced stretch films of the art. At the same time functional tear blockage without obstructing the film cutting at the end of each wrapping process is fulfilled.

The following non-limiting examples demonstrate some reinforced stretch films of the present invention.

EXAMPLE 1

Reinforced stretch film is provided wherein the base stretch film has a thickness of 12 μm having thereon 32 flat, continuous and longitudinal reinforcing strips. The width of said reinforcing strips is 3.5 mm having a thickness of 18 μm. The area percentage of stretch film covered by strips is 22.4% with an average distance of adjacent strips of about 2% to 3% the width of the base film. The weight percentage of strips over the overall weight is 25.1%, whereas the width of said reinforced stretch film is 50 cm and weighs 14.7 g/m$^2$.

EXAMPLE 2

Reinforced stretch film is provided wherein the base stretch film has a thickness of 12 μm having thereon 16 flat, continuous and longitudinal reinforcing strips. The width of said reinforcing strips is 3.5 mm having a thickness of 18 μm. The area percentage of stretch film covered by strips is 11.2% with an average distance of adjacent strips of about 4.5% to 5.5% the width of the base film. The weight percentage of strips over the overall weight is 14.4%, whereas the width of said reinforced stretch film is 50 cm and weighs 12.9 g/m$^2$.

EXAMPLE 3

Reinforced stretch film is provided wherein the base stretch film has a thickness of 12 μm having thereon 8 flat, continuous and longitudinal reinforcing strips. The width of said reinforcing strips is 3.5 mm having a thickness of 18 μm. The area percentage of stretch film covered by strips is 5.6% with an average distance of adjacent strips of about 10% to 12% the width of the base film. The weight percentage of strips over the overall weight is 7.7%, whereas the width of said reinforced stretch film is 50 cm and weighs 12.0 g/m$^2$.

EXAMPLE 4

Reinforced stretch film is provided wherein the base stretch film has a thickness of 12 μm having thereon 8 flat, continuous and longitudinal reinforcing strips. The width of said reinforcing strips is 15 mm having a thickness of 18 μm. The area percentage of stretch film covered by strips is 24.0% with an average distance of adjacent strips of about 8% to 10% the width of the base film. The weight percentage of strips over the overall weight is 26.4%, whereas the width of said reinforced stretch film is 50 cm and weighs 15.0 g/m$^2$.

EXAMPLE 5

Reinforced stretch film is provided wherein the base stretch film has a thickness of 9 μm having thereon 32 flat, continuous and longitudinal reinforcing strips. The width of said reinforcing strips is 3.5 mm having a thickness of 9 μm. The area percentage of stretch film covered by strips is 22.4% with an average distance of adjacent strips of about 2% to 3% the width of the base film. The weight percentage of strips over the overall weight is 18.3%, whereas the width of said reinforced stretch film is 50 cm and weighs 10.1 g/m².

COMPARATIVE EXAMPLE 1

Reinforced stretch film is provided wherein the base stretch film has a thickness of 12 μm having thereon 3 flat, continuous and longitudinal reinforcing strips. The width of said reinforcing strips is 18.7 mm having a thickness of 18 μm. The area percentage of stretch film covered by strips is 11.2% with an average distance of adjacent strips of about 37% to 40% the width of the base film. The weight percentage of strips over the overall weight is 14.4%, whereas the width of said reinforced stretch film is 50 cm and weighs 12.9 g/m².

COMPARATIVE EXAMPLE 2

Reinforced stretch film is provided wherein the base stretch film has a thickness of 12 μm having thereon 4 flat, continuous and longitudinal reinforcing strips. The width of said reinforcing strips is 80 mm having a thickness of 18 μm. The area percentage of stretch film covered by strips is 64.0% with an average distance of adjacent strips of about 8% to 10% the width of the base film. The weight percentage of strips over the overall weight is 48.9%, whereas the width of said reinforced stretch film is 50 cm and weighs 21.6 g/m².

Figure 2:
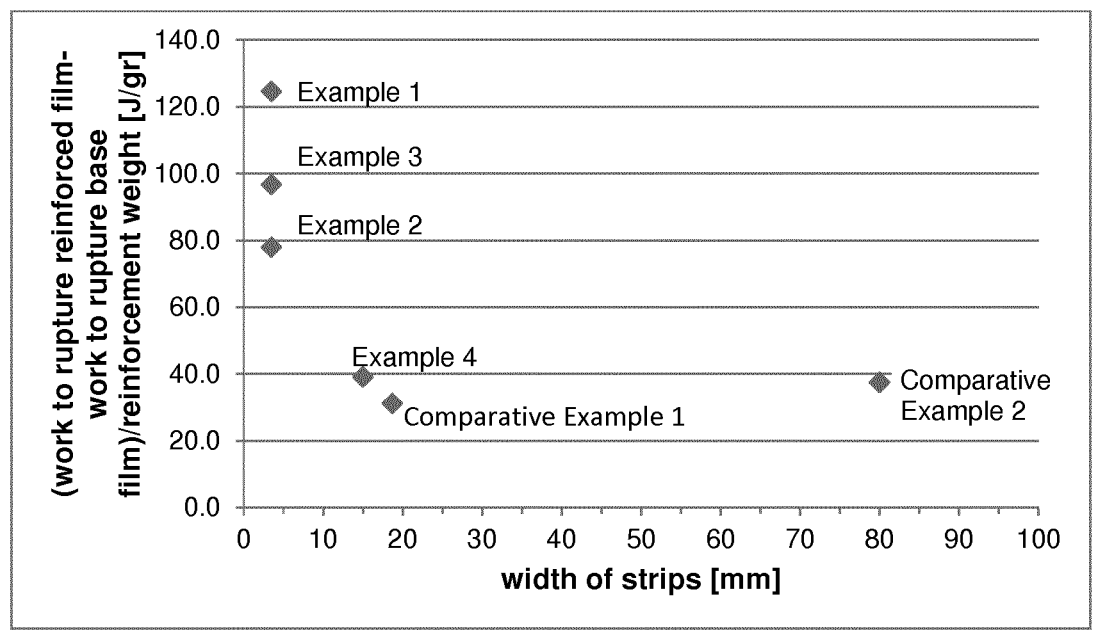
FIG. 2 depicts the work to rupture a reinforced film minus the work to rupture its base stretch film without reinforcements over the weight of reinforcements versus the width of said reinforcing strips.

Some inventive reinforced stretch films of present invention are compared to reinforced stretch films proposed by prior art and depicted in FIGS. 1 and 2. In order to ensure direct comparison the same base stretch film of 50 cm in width and 12 μm in thickness was picked for the manufacturing of all these reinforced films. Similarly, the reinforcing strips were cut at various strip widths from the same stretch film of 18 μm in thickness. FIG. 1 collates the time required to rupture the above-mentioned reinforced films minus the time required to rupture the base stretch film (i.e. no reinforcements thereon) over the weight of the reinforcement strips involved versus, the width of the reinforcing strips. This specific time presents a surprising increment when the strip width becomes lower than 15 mm. FIG. 2 depicts the work to rupture a reinforced film minus the work to rupture its base stretch film without reinforcements over the weight of reinforcements, versus the width of said reinforcing strips. Similarly, this specific work presents a surprising increment when the strip width becomes lower than 15 mm.

Following the teaching of prior art, someone of ordinary skill in the art may use relatively wide reinforcing strips to reinforce a stretch film (e.g. 80 mm, 60 mm, 50 mm, 20 mm and the like). Moreover, someone of ordinary skill in the art may vary the width and the number of strips in order to reduce weight, but would not use narrow strips. Such an option would appear in first view to have no merit. Narrow strips are considered strip widths of 1 mm, 3 mm, 6 mm, 9 mm, 12 mm and the like according to the present invention. The efficiency of various wide reinforcing strips is more or less comparable, contrary to the narrow strips which yield non-obvious improvement of the efficiency results.

The scope of the invention is defined in the appended claims.

The invention claimed is:

1. A non-perforated reinforced stretch film consisting of: a base film which has a thickness in the range of 3 μm to 18 μm, and 5 to 100 reinforcing strips fixed on at least one surface of said base film, wherein the width of each reinforcing strip is, independently, in the range of 1 mm to 17 mm.

2. A film according to claim 1, wherein the distance between adjacent reinforcing strips is 0.5% to 40% of the width of the film.

3. A film according to claim 1, wherein the thickness of the base film is less than 15 μm.

4. A film according to claim 3, wherein the thickness of the base film is from 3 μm to 9 μm.

5. A film according to claim 1, wherein the number of reinforcing strips on said film is 5 to 80.

6. A film according to claim 1, wherein the width of each reinforcing strip is, independently, in the range of 1 mm to 15 mm.

7. A film according to claim 1, wherein the width of said reinforced stretch film is from 30 cm to 190 cm.

8. A film according to claim 1, wherein the weight of said reinforced stretch film is less than 22 g/m².

9. A film according to claim 1, wherein the ratio of the width over the height of each reinforcing strip is 10 to 3000.

10. A film according to claim 1, wherein at least one reinforcing strip is longitudinal.

11. A film according to claim 1, wherein all reinforcing strips are longitudinal and continuous.

12. A film according to claim 1, wherein at least one reinforcing strip is flat.

13. A film according to claim 1, wherein at least one reinforcing strip is folded about its longitudinal axis.

14. A film according to claim 1, wherein at least one reinforcing strip contains wrinkles and/or corrugations.

15. A film according to claim 1, wherein the area percentage of stretch film covered by said reinforcing strips over said film is 0.5% to 70%.

16. A film according to claim 1, wherein the thickness of each reinforcing strip is, independently, in the range 3 μm to 90 μm.

17. A film according to claim 1, wherein the percentage of weight of the plurality of reinforcing strips over the overall weight of the reinforced stretch film is 60% or lower.

18. A film according to claim 1, wherein the base film is a multilayer base film.

19. A film according to claim 1, wherein the reinforced stretch film is hemmed.

20. A film according to claim 1, wherein the reinforced stretch film is 10% to 250% pre-stretched prior handling.

21. A film according to claim 1, wherein the reinforced stretch film is pre-stretched prior to handling and the stretch film has low remaining stretch-ability.

22. A film according to claim 1, wherein the reinforced stretch film is provided on a roll.

23. A film according to claim 1, wherein the distance between adjacent reinforcing strips is 1% to 35% of the width of the film.

24. A film according to claim 1, wherein the distance between adjacent reinforcing strips is 1% to 25% of the width of the film.

25. A film according to claim 1, wherein the distance between adjacent reinforcing strips is 1% to 15% of the width of the film.

26. A film according to claim 1, wherein the thickness of the base film is less than 12 μm.

27. A film according to claim 1, wherein the thickness of the base film is less than 10 μm.

28. A film according to claim 1, wherein the number of reinforcing strips on said film is 10 to 40.

29. A film according to claim 1, wherein the number of reinforcing strips on said film is 15 to 30.

30. A film according to claim 1, wherein the width of each reinforcing strip is, independently, in the range of 1 mm to 12 mm.

31. A film according to claim 1, wherein the width of each reinforcing strip is, independently, in the range of 2 mm to 10 mm.

32. A film according to claim 1, wherein the width of said reinforced stretch film is from 100 cm to 190 cm.

33. A film according to claim 1, wherein the width of said reinforced stretch film is from 30 cm to 110 cm.

34. A film according to claim 1, wherein the weight of said reinforced stretch film is less than 20 g/m$^2$.

35. A film according to claim 1, wherein the weight of said reinforced stretch film is less than 18 g/m$^2$.

36. A film according to claim 1, wherein the ratio of the width over the height of each reinforcing strip is 20 to 2000.

37. A film according to claim 1, wherein the ratio of the width over the height of each reinforcing strip is 30 to 1000.

38. A film according to claim 1, wherein all reinforcing strips are longitudinal.

39. A film according to claim 1, wherein the area percentage of stretch film covered by said reinforcing strips over said film is 2% to 50%.

40. A film according to claim 1, wherein the area percentage of stretch film covered by said reinforcing strips over said film is 5% to 40%.

41. A film according to claim 1, wherein the area percentage of stretch film covered by said reinforcing strips over said film is 10% to 30%.

42. A film according to claim 1, wherein the thickness of each reinforcing strip is, independently, in the range 4 μm to 50 μm.

43. A film according to claim 1, wherein the percentage of weight of the plurality of reinforcing strips over the overall weight of the reinforced stretch film is in the range 0.5% to 60%.

44. A film according to claim 1, wherein the percentage of weight of the plurality of reinforcing strips over the overall weight of the reinforced stretch film is in the 2% to 40%.

45. A film according to claim 1, wherein the percentage of weight of the plurality of reinforcing strips over the overall weight of the reinforced stretch film is in the range 5% to 30%.

46. A film according to claim 1, wherein the percentage of weight of the plurality of reinforcing strips over the overall weight of the reinforced stretch film is in the range 10% to 20%.

* * * * *